United States Patent
Zhong

(10) Patent No.: US 7,369,649 B2
(45) Date of Patent: May 6, 2008

(54) SYSTEM AND METHOD FOR CALLER INITIATED VOICEMAIL ANNOTATION AND ITS TRANSMISSION OVER IP/SIP FOR FLEXIBLE AND EFFICIENT VOICE MAIL RETRIEVAL

(75) Inventor: Jialin Zhong, Berkeley Heights, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 194 days.

(21) Appl. No.: 10/642,087

(22) Filed: Aug. 15, 2003

(65) Prior Publication Data

US 2005/0037739 A1    Feb. 17, 2005

(51) Int. Cl.
*H04M 1/64* (2006.01)
(52) U.S. Cl. .................. 379/88.27; 379/88.11; 379/88.14; 379/88.18; 379/88.24; 455/413; 715/512; 715/522; 715/523
(58) Field of Classification Search ............ 379/88.24, 379/88.27; 455/413
See application file for complete search history.

(56) References Cited

U.S. PATENT DOCUMENTS

| | | | | |
|---|---|---|---|---|
| 4,627,001 A | * | 12/1986 | Stapleford et al. .......... | 704/260 |
| 4,837,798 A | * | 6/1989 | Cohen et al. ............ | 379/88.14 |
| 5,742,736 A | * | 4/1998 | Haddock .................... | 704/270 |
| 5,850,519 A | * | 12/1998 | Vazana ....................... | 709/206 |
| 5,943,402 A | * | 8/1999 | Hamel et al. ............ | 379/88.26 |
| 6,125,376 A | * | 9/2000 | Klarlund et al. ............ | 715/513 |
| 6,249,765 B1 | | 6/2001 | Adler et al. | |
| 6,459,774 B1 | * | 10/2002 | Ball et al. .................. | 379/67.1 |
| 6,507,643 B1 | | 1/2003 | Groner | |
| 6,529,870 B1 | | 3/2003 | Mikkilineni | |
| 6,560,318 B1 | * | 5/2003 | Spielman et al. ........ | 379/88.12 |
| 6,876,729 B1 | * | 4/2005 | Kuter et al. ............. | 379/88.22 |
| 7,260,190 B2 | * | 8/2007 | Fellenstein et al. ...... | 379/88.24 |
| 2002/0076014 A1 | * | 6/2002 | Holtzberg ................ | 379/88.23 |
| 2002/0098831 A1 | * | 7/2002 | Castell et al. ............... | 455/413 |
| 2002/0110226 A1 | * | 8/2002 | Kovales et al. .......... | 379/88.17 |
| 2003/0128817 A1 | * | 7/2003 | Myers et al. ............... | 704/270 |
| 2004/0081296 A1 | * | 4/2004 | Brown et al. ............ | 379/88.14 |
| 2004/0093217 A1 | * | 5/2004 | Yeh et al. ................ | 704/270.1 |
| 2004/0141594 A1 | * | 7/2004 | Brunson et al. ......... | 379/88.12 |

* cited by examiner

*Primary Examiner*—Fan Tsang
*Assistant Examiner*—Hemant Patel
(74) *Attorney, Agent, or Firm*—Muncy, Geissler, Olds & Lowe, PLLC

(57) ABSTRACT

A voice-mail annotation system and method that enables callers to annotate the messages they leave at the time they leave them. Annotation may be performed using a touch screen or a telephone key-pad. In addition to allowing the caller to more clearly specify the intent of their message and the location of crucial information within the message, the annotations of this invention then allow the person retrieving the message flexibility in how they listen to the message. These choices include prioritizing the messages by the importance of subject, listening to summaries of the message and having random access to embedded information such as names and call back numbers.

21 Claims, 5 Drawing Sheets

SYSTEM AND METHOD FOR CALLER INITIATED VOICEMAIL ANNOTATION AND ITS TRANSMISSION OVER IP/SIP FOR FLEXIBLE AND EFFICIENT VOICE MAIL RETRIEVAL

FIELD OF THE INVENTION

The present invention relates to systems and methods for annotating stored audio signals and particularly to systems and methods for caller initiated annotation of voicemail.

BACKGROUND OF THE INVENTION

Voice mail is an integral part of enterprise communications in which a caller leaves an audio message in a voice mailbox when a called party is absent, unable or unwilling to talk to the caller at that particular time. Unlike a phone conversation, which is a two-party, bi-directional communication, voice mail is a two-party unidirectional communication as the party retrieving the voice mail message cannot ask questions if there are any ambiguities in the information left for them.

Moreover, in existing voice mail systems voice mail messages are retrieved linearly, meaning that the person retrieving the message often has to listen to an entire message a second time in order to get a particular item of information. Even in systems having the capability for the caller to leave a call back number, the number is left sequentially with the voice mail message, effectively as another short voice message.

There are proposals to use Automatic Speech Recognition (ASR) to make access to voice mail more efficient. For instance, U.S. Pat. No. 6,249,765 to Adler, et. al entitled "System and method for extracting data from audio messages", and U.S. Pat. 6,529,870 to Mikkilineni entitled "Identifying voice mail messages using speaker identification", both of which are hereby incorporated by reference, describe systems in which ASR is integrated into voice mail. There have also been proposals to use ASR to transcribe voice mail into electronic text and then have Information Retrieval (IR) technology decipher the caller's intention and other aspects of the message content, as described in for instance, but not limited to, U.S. Pat. No. 6,507,643 to Groner entitled "Speech recognition system and method for converting voice mail messages to electronic mail messages", the contents of which are hereby incorporated by reference.

Despite the promise of easy and convenient access to voice mail that such "intelligent" Automatic Speech Recognition (ASR)/Information Retrieval (IR) technologies systems offer, there are disadvantages.

Firstly, ASR and IR systems are often expensive additions to a voice mail system. Secondly, ASR/IR is not yet mature enough to handle the diversity of speaking styles and content encountered in most enterprises. Thirdly, in the ASR/IR model, a third party agent, usually in the form of a software application, is introduced to interpret the caller's message and intentions when the caller is the one who best knows what is intended and which parts of the message are important. A better system model is one in which the caller, who already knows what is intended and which parts of the message have increased importance, is facilitated to annotate the message.

What is needed is a cost effective method that allows the caller to annotate the voicemail they are leaving, at the time they leave it, thereby allowing the message recipient a choice of how to retrieve messages including being able to prioritize messages, hear only summaries of message and to have random access to specific information embedded in messages, such as names and call back numbers.

SUMMARY OF THE INVENTION

The system and method of this invention overcomes the problems associated with prior art voice-mail systems, as detailed above, by enabling callers to annotate their messages at the time they leave them. This allows the caller to specify the intent of their message and the location of crucial information within the message in a clearer and more exact manner. In the preferred embodiment of the invention, the caller leaves both a voice message and a parallel, accompanying markup file containing message structure descriptors. The message structure descriptors in the parallel markup file identify particular parts of the voice message. For instance, the message structure descriptors may be, but are not limited to, links or annotations identifying which parts of the message are important or urgent, where a caller name or call back number is located or when a message changes topic. The markup file may also identify a message subject. In the preferred embodiment of the invention, the message structure descriptors may also be used by the called party to facilitate different ways of receiving or 'consuming' the message. For instance, the markup files may give the called party the ability to prioritize the messages they receive by the importance of subject, to listen to summaries of the message and to have random access to specific information within the message.

A further advantage of using a parallel markup channel to convey the message structure descriptors is that this markup channel may be of significantly smaller bandwidth than the associated-voice-channel, allowing the markup channel to be broadcast separately over limited bandwidth communications channels such as, but not limited to, Short Message Services (SMS), pager communications channels or Personal Digital Assistant (PDA) communications channels. In this way the user may receive the markup of the conversation as, for instance, an alert or attention grabbing short text message containing some pertinent information, such as but not limited to a caller identification, a subject, a level of importance or a call-back number. In a further embodiment of the invention, content of the markup file may be complete in itself or it may serve as a prompt for the called party to get the voice-message associated with it.

In the preferred embodiment of the invention, the caller creates the markup file of annotations to accompany the message they are leaving using a device such as, but not limited to, a touch screen or a telephone key-pad.

In the preferred embodiment of this invention a voice signal containing the message and an associated markup file containing the annotations are transmitted using Session Initiation Protocol (SIP) over an Internet Protocol (IP) network.

In a further embodiment of the invention, the caller is able to modify the markup file they are leaving after the voice message they are leaving has been recorded or stored.

The advantages of the system and method of this invention include the ability of the caller to more precisely convey and record their intentions and purpose, including highlighting specific content. This ability is facilitated at a point in the communication when that information is most available and valuable, at minimal extra cost and in a way that allows flexible retrieval of the information. The system and method of the current invention transforms the caller experience from merely talking to a machine to composing a message that more clearly conveys the callers intent and purpose.

DETAILED DESCRIPTION

During the course of this description like numbers will be used to identify like elements according to the different views that illustrate the invention.

Figure 1:
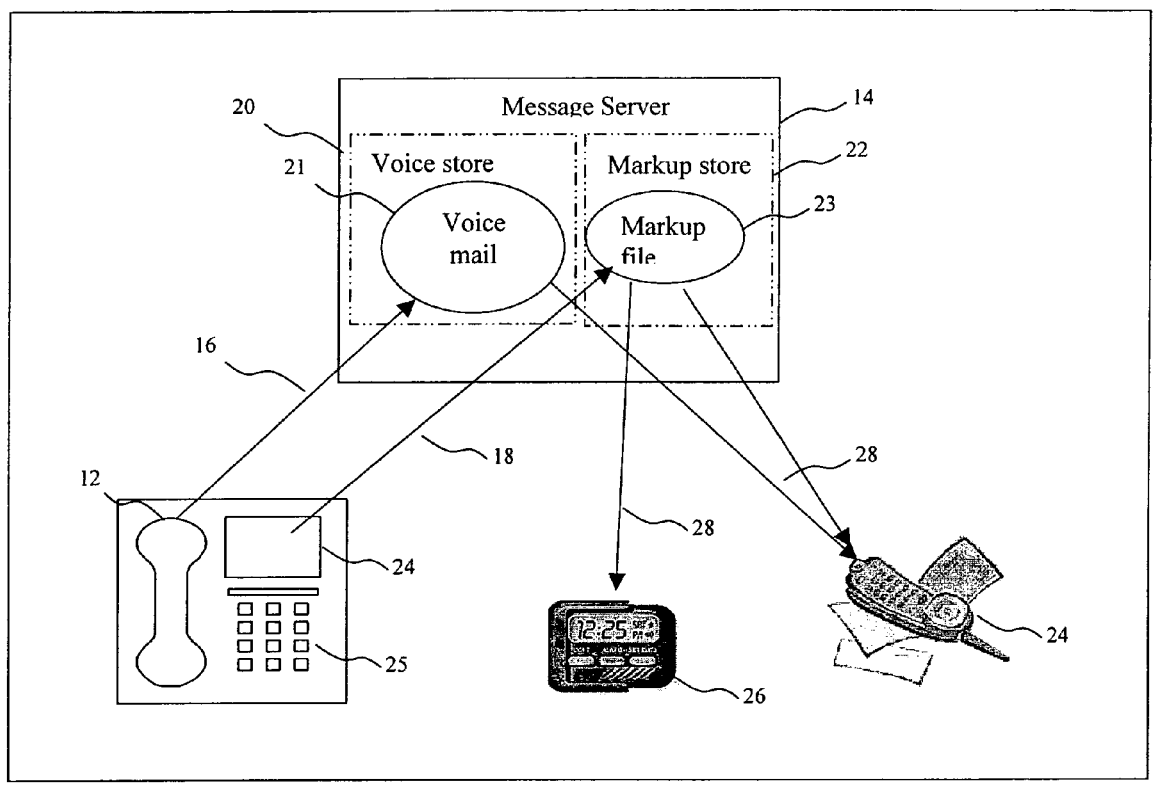
FIG. 1 is a schematic overview of a Caller Initiated Voicemail Annotation (CIVA) system.

FIG. 1 is a schematic overview of a Caller Initiated Voicemail Annotation (CIVA) system. The caller uses a voice communications device 12, which may be, but is not limited to, a telephone, a wireless telephone or a suitably adapted Personal Digital Assistant (PDA), to attempt to contact a second party. The voice communications device 12 may be connected via a suitable network (not shown) such as, but not limited to, the Plain Old Telephone System (POTS), a wireless network or a Voice over Internet Protocol (VoIP) system.

In the event of the called party not being available to participate in a conversation, the caller may be transferred into the message server 14. The caller is then linked to the message server 14 by a circuit capable of handling both a voice channel 16 and a markup channel 18. The message server 14 may be a software package running on a suitable hardware platform such as, but not limited to, Avaya's INTUITY™ AFINITY LX message server, a Voice Over the Internet Protocol (VoIP) server or an AUDio Information eXchange (AUDIX) protocol server. The message server is adapted to include a voice information store 20 for storing the voice message 21 and a markup store 22 for storing the related markup file 23 containing message structure descriptors.

The caller may use either a Graphic User Interface (GUI) 24 displayed on a suitable image display associated with the communications device 12, or a Touch User Interface (TUI) 25, comprising selected and predefined keys associated with the communications device 12, or a suitable combination of the two, to augment their message with suitable message structure descriptors as he or she speaks.

The caller voice message augmentation may include communications cues such as, but is not limited to, global features including message characterization, priorities and profiles; critical content cues including names, phone numbers, highlights and topic changes; and social cues including smiley faces and exclamation marks. The GUI 24 and the TUI 25 of the preferred embodiment may also allow the caller to edit their message after initial recording, including displaying the message in a waveform representation and adding or removing any of the augmentation or markups.

The voice message augmentations may for instance be generated in and stored in a suitable markup language such as, but not limited to, the eXtended Markup Language (XML) or the Synchronized Media Integration Language (SMIL) of the World Wide Web Consortium (W3C).

Once the voice message 21 is stored in the voice store 20 and the associated augmentations are stored as a markup file 23 in the markup store 22, the intended recipient may access them using a suitable voice communications device 24, such as but not limited to, a telephone, a wireless telephone or a suitably adapted PDA. The intended recipient may also access portions of the message stored in the markup store via a suitable text communication device 26 such as, but not limited to, a pager, a Blackberry™ device or a suitable PDA. The intended recipient's communication device 24 or 26 is typically linked to the message server via a suitable communications network 28 such as, but not limited to, the Plain Old Telephone System (POTS), a wireless network or a Voice over Internet Protocol (VoIP) system or a satellite communications system.

When the intended recipient accesses the message server 14 using a voice communication device 24, the recipient may retrieve their voice messages in a flexible manner with random access and the options of for instance, but not limited to, playing the voicemail as it is, enhancing the voicemail using markup cues that for instance boost the volume of important parts, or condensing or summarizing the voicemail, or randomly accessing critical information such names or numbers.

Alternately, when the recipient accesses the message server via a suitable text communication device 26, the recipient may obtain critical information such as, but not limited to, names and numbers. The critical information may also be made available in Instant Message (IM) form to the text communication device 26 as soon as the voice message is recorded. The markup file 23 may be broadcast or otherwise transmitted including, but not limited to, as a Instant Message or as an e-mail or as an attachment thereto. This transmission may be done automatically by a suitable software program or module in the message server when the markup file 23 is stored or it may be triggered at preset intervals after storage. The transmission may serve as the entire communication or as a prompt for the user to retrieve the voice message 21 it is associated with.

Figure 2:
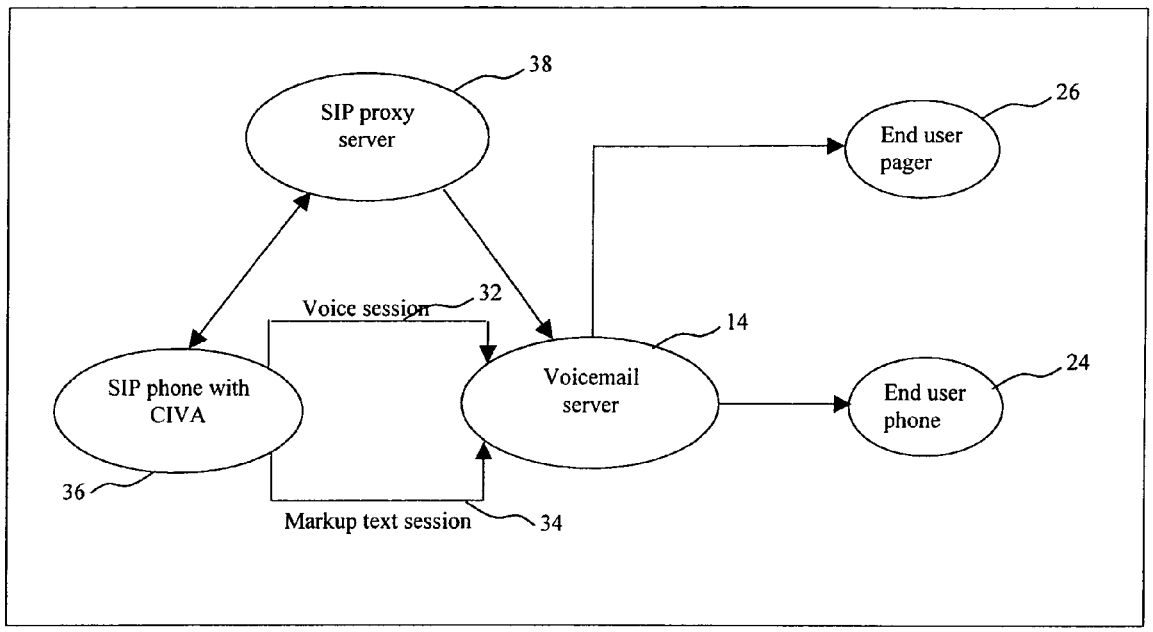
FIG. 2 is a schematic representation of an IP/SIP implementation of a Caller Initiated Voicemail Annotation (CIVA) system.

FIG. 2 shows a schematic drawing of the present invention implemented using a Session Initiated Protocol (SIP).

SIP provides a way to transmit both a voice session 32 and a markup text session 34 from the caller's IP/SIP phone 36 to a voicemail server 14 with signaling via a SIP proxy or connection server 38. The SIP phone 36 issues an INVITES message to the voicemail server 14 via the SIP proxy or connection server 38, requesting a connection via the connection server 38 for two media sessions, a voice session 32 for the voice message and a markup text session 34 for the annotation markup file. The voice session 32 is specified in the Session Description Protocol (SDP) as having a Multipurpose Internet Mail Extension (MIME) type of audio, while the markup text session 34 is specified as having a MIME type of text. The voicemail server 14 responds with appropriate acknowledgement (ACK) messages to either accept both sessions or to accept only the voice mail, depending on the voicemail server 14's capability.

Figure 3:
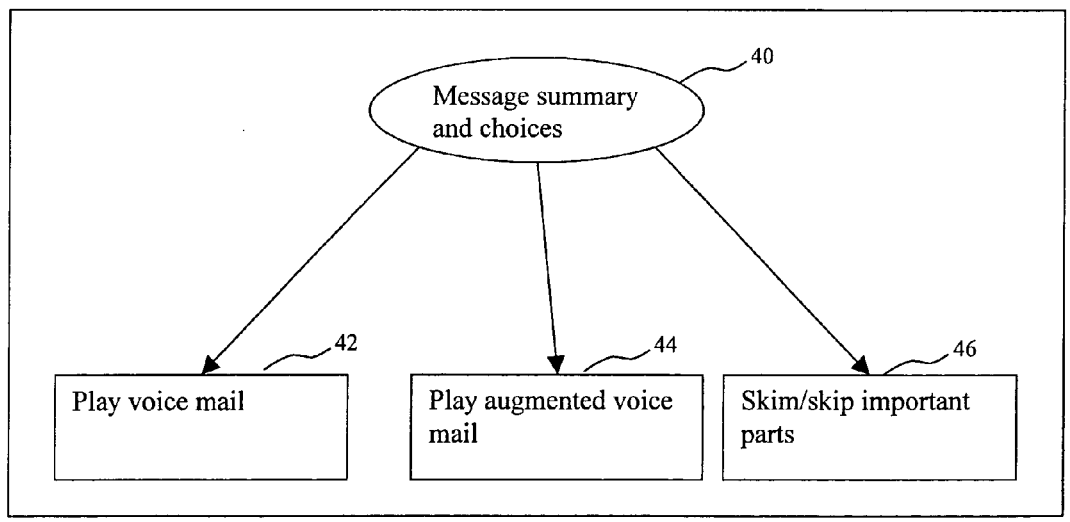
FIG. 3 is a schematic representation of a message retrieving interface.

FIG. 3 is a schematic representation of a simple but powerful message retrieval interface having a short summarizing header 40, that includes three options or message rendering choices that may be selected from any end point. In this embodiment of the invention the options are: playing the original voice mail as a whole 42, playing an augmented version of the original voice mail 44, or skimming only the important parts of the message 46. The summarization 46 is generated from the annotation file and includes statistics on names, callback numbers, or important message bodies such as subjects. A message summary 40 may for example be: "Voice mail message 2 on the subject of <audio of subject> contains 1 name and 2 callback numbers. Press 1 to play the whole message, 2 to play an augmented message or 3 to skim and skip."

Playing the whole message 42 is simply the traditional way to play voice mail.

Playing an augmented message 44 results in the crucial parts of the original message being made more prominent by speech processing techniques such as, but not limited to, boosting up the volume or the bass of important sections, or inserting beeps or other distinct sounds or tones before or after important sections. In one embodiment of the invention particular sounds or tones may alert the user to particular items. For example, a particular tone may be associated with a call back number, another tone may be associated with a name and a third tone may always precede an import message section. In another embodiment of the invention the message may be augmented by playing different parts of the message at different speeds. For instance, names, numbers and important parts of the message may be played at normal speed or slightly slowed down, while the rest of the message is played speeded up. In a further embodiment of the invention, when the user's voice communication device with which they are accessing the voicemail system has a screen, the message may be augmented by displaying text strings of the important parts, in a manner analogous to text display in TV closed captioning.

By selecting the option to skim the message 46, the user can retrieve name and callback number pairs, skip from one topic to next, or only listen to what is important.

Figure 4:
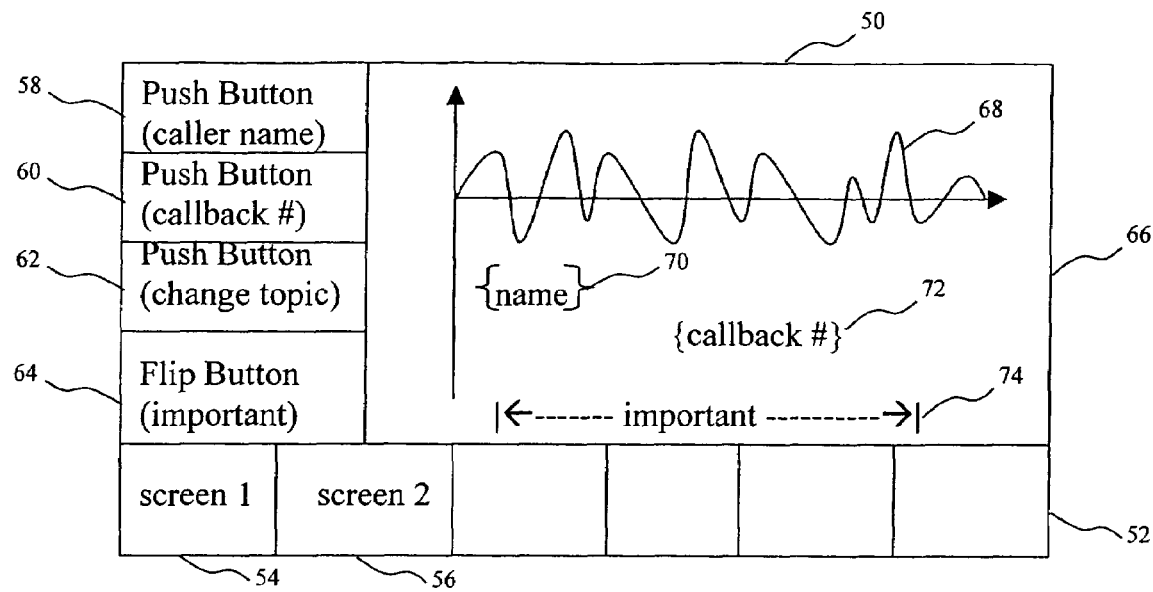
FIG. 4 is a schematic example of a GUI for a caller to annotate voice mail.

FIG. 4 is a schematic example of a GUI 50 of one embodiment of the invention, as implemented on an endpoint touch-screen such as that found on for instance, but not limited to, an Avaya 4360 IP phone, or a touch pad attached to an IP phone. The GUI allows a caller to annotate voice mail with a minimum of distractions by associating our screen actions like clicking a button with predefined concepts like phone numbers, name strings or prominence of contents. The bottom row 52 includes buttons 54 and 56 for switching to different call-function screens such as, but not limited to screens containing speed dial numbers. On the left are predefined buttons for annotations. The buttons used for short and transient information such as 'caller name' button 58, 'call back' button 60 and 'change topic' button 62 are one-click, push buttons that generate a text attribute at the time they are pushed. On the other hand the 'important' button 64 is a flip button. When clicked a first time, a flip button records the start of an attribute. A second click of the flip button marks the end of the attribute. These two-click, flip buttons are used for generating attributes to attach to long lasting events such as subject lines or for highlighting a segment of the speech.

On the top right is a display window 64 to show speech waveforms 68 and attributes 70, 72 and 74. In the preferred embodiment, the user has the freedom to program any number of buttons with any concepts and to label them by associating text strings with them.

Figure 5:
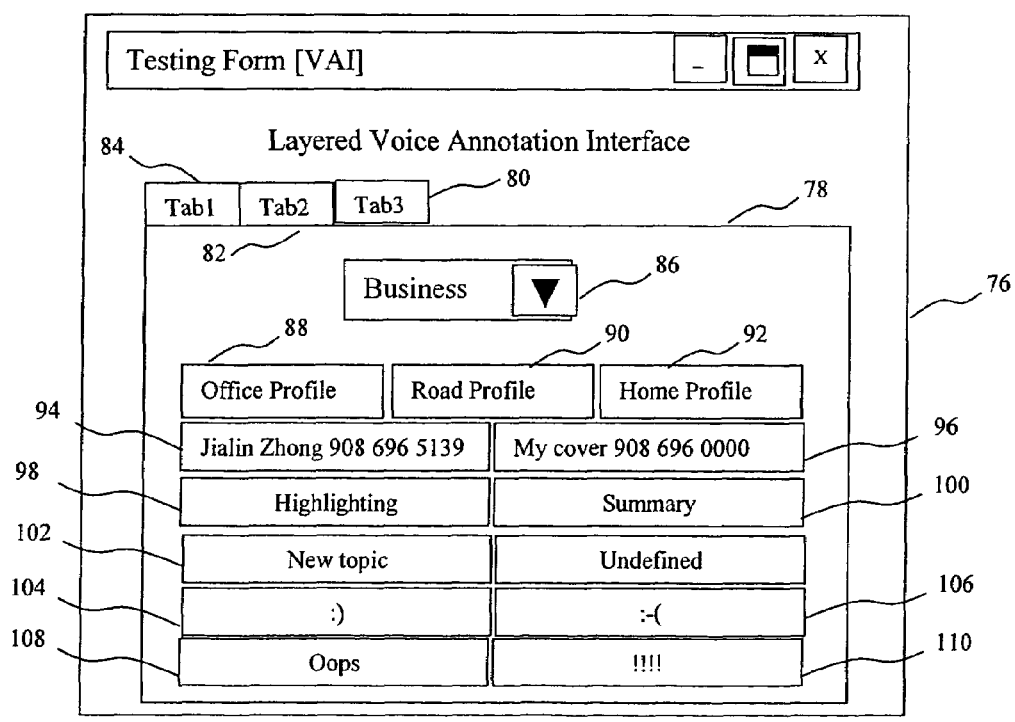
FIG. 5 is a further schematic example of an annotation interface design or GUI.

FIG. 5 shows a GUI interface 76 of another embodiment of the present invention. The GUI window is capable of displaying a number of layers 78 using tab selectors 80, 82 and 84. Each layer 78 contains a number of selector and predefined buttons. For example, a layer may contain one or more selector buttons such as selector button 86 for indicating the message type. Each layer may also have a number of predefined buttons, such as, office profile button 88, road profile button 90, home profile button 92, name and number button 94, cover name and number button 96, highlighting button 98, summary button 100, new topic button 102, smiling face button 104, frowning face button 106, an 'oops' button 108 and an exclamation button 110.

Figure 6:
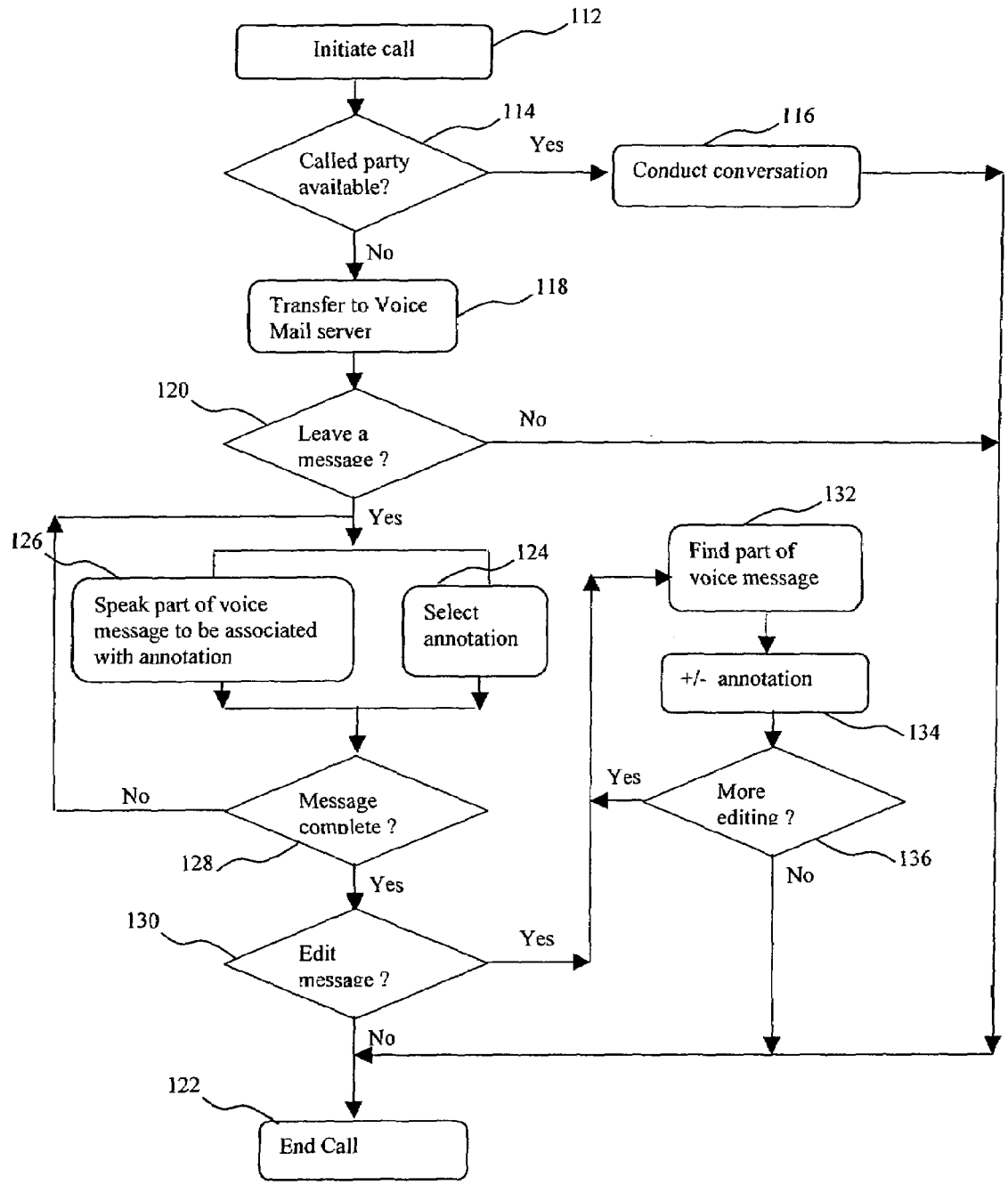
FIG. 6 is a flow diagram showing how a user annotates a message.

FIG. 6 is a flow diagram showing how a user annotates a message using the present invention.

In step 112, the user initiates a call over a voice enabled network such as, but not limited to a Public Switched Telephone Network (PSTN), a wireless network or an Internet or a Voice over Internet Protocol (VoIP) system. In step 114, the network or equipment attached to the network or the called party themselves determine whether or not the call can be completed and the caller place in direct voice communication with the called party. If this connection is possible and desired by the called party, step 116 of conducting a conversation occurs. If the connection is not possible, or the called party is not present or the called party does not desire to take the call, the caller is transferred to the voice mail server in step 118. In step 120 the voice mail server ascertains whether or not the caller wants to leave a message. If the caller does not want to leave a message, the caller proceeds to step 122 of ending the call. If however the caller does want to leave a message, the voice mail server allows the caller to start recording a voicemail message in step 126. As caller is leaving the voice message, they are simultaneously enabled to select annotations in step 124. These annotations are associated with the part of the message being spoken, and in the preferred embodiment will be stored in a markup file as message structure descriptors. The annotation in step 124 includes the option of no annotation for this portion of the message. At the end of the part of the voice message associated with the selected annotation, the user decides if the message is complete in step 128. If the message is not complete, the caller loops back to steps 126 of leaving a message and the parallel step 124 of selecting an associated annotation. Once the caller has completed their message, then in step 130 the voice mail system may give them the opportunity to edit the annotations left in the message. If the caller elects to edit the annotations they have left, step 132 enables them to find a particular part of the voice message. Step 134 then allows the caller to either add a new annotation or to subtract an existing annotation. Having made a change, step 136 ascertains if the caller has any more changes to make. If there are more changes required, the caller loops back to step 132. If there are no more changes required, caller then goes to step 122 of ending the call.

Figure 7:
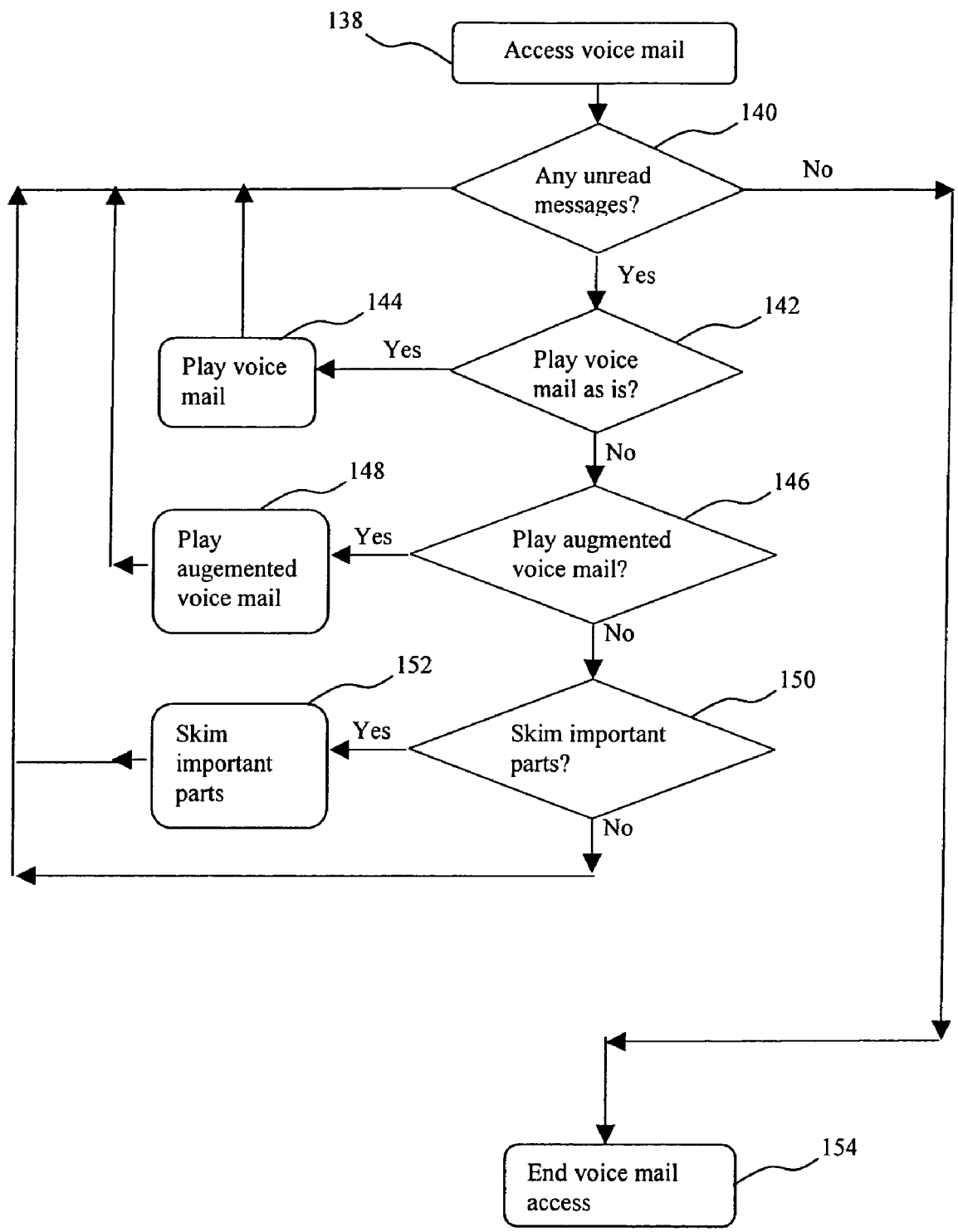
FIG. 7 is a flow diagram showing how a user retrieves an annotated message.

FIG. 7 is a flow chart that shows how a user retrieves their voice mail in one embodiment of the invention. The users first action is step 138 of accessing their voice mail system. This access may for instance include, but is not limited to, dialing the number of a voice-message mailbox using a conventional phone. In step 140 the user is informed of whether there are any unread messages left in the voice-message mailbox. The step 140 of informing the user if there are any unread messages may include playing a summarized version of the message in which the user is informed of the subject and information about the message including how many call back numbers there are in the message. If there are messages, then the user has a choice of how to play the messages. The options may include step 142, which allows the user to proceed to step 144 in which the voice-message is played with no alteration. A second option is step 146 in which the user has the option of playing an augmented voice-mail in step 148. The augmentation in step 148 may take the form of a change of volume or change of tone or change of speed between the parts of the voice-mail considered important and those parts considered less important. A third option is step 150 which allows the user to skim through the message. Step 152 of skimming through the important parts may also include the ability to randomly access particular attributes such as, but not limited to, call back numbers. If there are no unread messages left, the system proceeds to step 154 in which access to the voice-mail system is ended.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A caller-initiated voicemail messaging system for annotating a first user's voicemail message, comprising:
   a first communications device, operable by said first user, for creating a markup file, said markup file including at least one message structure descriptor for the voicemail message;
   a message server configured for storing said markup file and a voice signal corresponding to said first user's voicemail message, wherein the message server is configured for transmitting said markup file to a second user;
   means operable by said first user for editing said markup file after said markup file has been stored at the message server;
   means for automatically notifying said second user that said voice signal and said markup file have been stored at the message server; and
   a second communications device, operable by the second, for retrieving a selected portion of said voice signal and for receiving said stored markup file from the message server,
   wherein the second communications device includes means for skimming said voice signal such that the second user only hears portions of the voice signal that have been annotated via the message structure descriptor without hearing portions of the voice signal other than the annotated portions.

2. The system of claim 1, further including means, operable by said first user, for creating said at least one message structure descriptor.

3. The system of claim 2, wherein said message structure descriptor is chosen selected from the group consisting of a caller name, a callback number, a change of topic marker, and a degree of importance marker.

4. The system of claim 1, wherein said markup file is an eXtended Markup Language (XML) file.

5. The system of claim 1, wherein said means for retrieving further includes means for playing an augmented version of said voice signal.

6. A method for annotating a first user's voicemail message, comprising:
   creating, by said first user, a markup file, including at least one message structure descriptor related to said first user's voicemail message;
   transmitting said markup file to a second user;
   storing said markup file and a voice signal corresponding to said first user's voicemail message at a voicemail message server;
   determining whether said markup file is to be edited;
   editing by said first user, based upon the determining, said markup file after said markup file has been stored at the message server;
   automatically notifying said second user that said voice signal and said markup file have been stored at the voicemail message server; and
   retrieving, by the second user, a selected portion of said voice signal using said stored markup file,
   wherein the retrieving step includes skimming said voice signal such that the second user only hears portions of the voice signal that have been annotated via the message structure descriptor without hearing portions of the voice signal other than the annotated portions.

7. The method of claim 6, wherein the first user creates said at least one message structure descriptor.

8. The method of claim 7, wherein said message structure descriptor is selected from the group consisting of a caller name, a callback number, a change of topic marker, and a degree of importance marker.

9. The method of claim 6, wherein said markup file is an eXtended Markup Language (XML) file.

10. The method of claim 6, wherein the retrieving further includes playing an augmented version of said voice signal.

11. An apparatus for annotating a first user's voicemail message, comprising:
    a user interface, operable by said first user, for creating a markup file, including at least one message structure descriptor for the voicemail message;
    a message server for storing said markup file and a voice signal corresponding to the first user's voicemail message;
    a message server module for automatically notifying a second user that said voice signal and said markup file have been stored;
    buttons, operable by said first user, for editing said markup file after said markup file has been stored at the message server;
    a message server module for transmitting said marker file to said second user; and
    a voice communications device, operable by the second user and including said stored markup file, for retrieving a selected portion of said voice signal from the message server,
    wherein the voice communication device includes a preset skimming button to skim said voice signal such that the second user only hears portions of the voice signal that have been annotated via the message structure descriptor without hearing portions of the voice signal other than the annotated portions.

12. The apparatus of claim 11, further including predefined keys, operable by said first user, for creating said at least one message structure descriptor.

13. The apparatus of claim 12, wherein said message structure descriptor is selected from the group consisting of a caller name, a callback number, a change of topic marker, and a degree of importance marker.

14. The apparatus of claim 11, wherein said markup file is an eXtended Markup Language (XML) file.

15. The apparatus of claim 11, wherein said voice communications device further includes a pre-set button to play an augmented version of said voice signal.

16. A method for annotating a first user's voicemail message, comprising:

creating, by the first user, a markup file including at least one message structure descriptor related to said first user's voicemail message, said message structure descriptor being created by selecting said message structure descriptor from the group consisting of a caller name, a callback number, a change of topic marker, and a degree of importance marker;

storing said markup file and a voice signal corresponding to said first user's voicemail message at a message server;

determining whether said markup file is to be edited;

editing by said first user, based upon the determining, said markup file after said markup file has been stored at the message server; and retrieving, by a second user, a selected portion of said voice signal from the message server using said stored markup file, wherein the retrieving step includes skimming said voice signal such that the second user only hears portions of the voice signal that have been annotated via the message structure descriptor without hearing portions of the voice signal other than the annotated portions.

17. An apparatus for annotating a first user's voicemail message, comprising:

a user interface, operable by said first user, for creating a markup file, including at least one message structure descriptor selected from the group consisting of a caller name, a callback number, a change of topic marker, and a degree of importance marker;

a message server for storing said markup file and a voice signal corresponding to the first user's voicemail message, wherein said user interface further allows the first user to edit said markup file after said markup file has been stored at the message server; and a voice communications device, operable by a second user and including said stored markup file, for retrieving a selected portion of said voice signal from the message server, wherein the voice communication device includes a preset skimming button to skim said voice signal such that the second user only hears portions of the voice signal that have been annotated via the message structure descriptor without hearing portions of the voice signal other than the annotated portions.

18. The system of claim 1, wherein said message server comprises said means for automatically notifying said second user that said voice signal and said markup file have been stored at the message server, said message server being configured to prompt the second user that the voicemail message is at the message server.

19. The system of claim 18, wherein the message server is configured to prompt the second user by transmitting only the markup file to the second communications device.

20. The method of claim 6, wherein automatically notifying said second user that said voice signal and said markup file have been stored at the voicemail message server consists of transmitting the markup file to the second communications device.

21. The apparatus of claim 11, wherein the message server module for automatically notifying the second user that said voice signal and said markup file have been stored is configured to automatically prompt the second user by transmitting only the markup file to the second communications device.

* * * * *